United States Patent [19]

Kutz, deceased et al.

[11] 4,077,605

[45] Mar. 7, 1978

[54] SEALED CARTRIDGE VALVE ASSEMBLY

[76] Inventors: Hugo Joseph Kutz, deceased, late of Grafton, N. Dak., by Thomas A. Kutz, executor, 504 Western Ave., Grafton, N. Dak. 58237

[21] Appl. No.: 639,800

[22] Filed: Dec. 11, 1975

[51] Int. Cl.$^2$ .............................................. F16K 31/00
[52] U.S. Cl. ............................... 251/335 A; 251/357; 137/606
[58] Field of Search .................... 251/335 A, 357, 358, 251/331; 137/327, 606

[56] References Cited

U.S. PATENT DOCUMENTS

| | | | |
|---|---|---|---|
| 1,865,824 | 7/1932 | Bradford | 251/357 |
| 1,913,381 | 6/1933 | Grass | 251/357 |
| 2,068,161 | 1/1937 | Bramsen et al. | 137/327 |
| 2,194,961 | 3/1940 | Walker | 251/357 |
| 2,717,757 | 9/1955 | Bowlzer | 251/357 |
| 2,823,006 | 2/1958 | Hare | 251/357 |
| 2,888,236 | 5/1959 | Hare | 251/357 |
| 3,352,532 | 11/1967 | Mooney et al. | 251/335 A |
| 3,698,688 | 10/1972 | Kutz | 251/335 A |
| 3,743,245 | 7/1973 | Demler, Sr. | 251/331 |
| 3,904,174 | 9/1975 | Giese | 251/335 A |

*Primary Examiner*—William R. Cline
*Assistant Examiner*—H. Jay Spiegel
*Attorney, Agent, or Firm*—James A. Wong

[57] ABSTRACT

This invention relates to the sealed faucet valve assembly which is particularly designed to repair corroded or damaged valve stem mechanisms without replacement of the entire faucet. Included is a novel faucet washer assembly which provides a sealed chamber to protect the securing screw from contact with corrosive liquids.

4 Claims, 3 Drawing Figures

SEALED CARTRIDGE VALVE ASSEMBLY

REFERENCE TO RELATED APPLICATIONS

This application is an improvement over my earlier U.S. Pat. No. 3,698,688 issued Oct. 17, 1972.

BACKGROUND OF THE INVENTION

This invention relates to a sealed valve assembly and more particularly to a sealed valve closure assembly for use with such valve assembly.

In some areas minerals and chemicals contained in the local municipal water supplies are sufficiently corrosive to cause deterioration after a few years of almost any exposed metal operating mechanisms of conventional water faucets which employ a threaded valve stem actuator. The soft metal chromed housings are subject to corrosion and even the screw securing the faucet seating washer to the valve stem. My earlier patent provided a sealed cartridge type valve operating mechanism designed especially to replace valve stem assemblies corroded beyond repair and such design has proven to be largely corrosion resistant to damage above the sealed diaphram. However, the metal sealing washer holder and the threaded washer securing means was still exposed to the corrosive chemicals. Eventually, the screw head or threaded portion can be eaten away which will readily break away preventing replacement of the faucet sealing washer without special tools. Also, portions of the metal washer holder will break away leaving the washer without a support base.

SUMMARY OF THE INVENTION

It is an object of the invention to provide a faucet valve cartridge assembly which is totally sealed and protected from the corrosive effects of minerals and chemicals contained within the water or other corrosive liquids.

It is another object to provide a valve closure assembly wherein the valve sealing member fastening means is sealed within a chamber and which yet may be readily removed to disassemble the faucet mechanism for inspection or repairs.

DETAILED DESCRIPTION OF THE INVENTION

Figure 1:
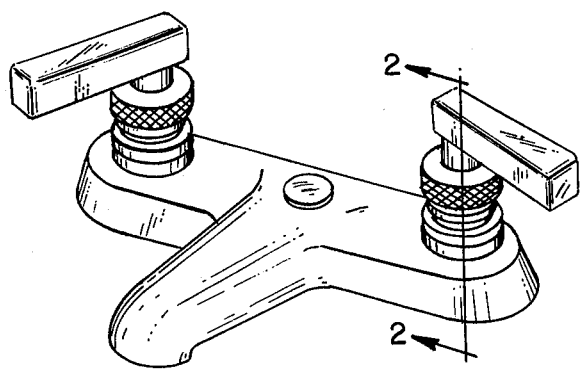
FIG. 1 is a plan view of a conventional faucet wherein each of the valve actuating means has been replaced by a valve cartridge assembly according to my invention.

With reference now to the drawings, it will be observed that FIG. 1 shows two of my replacement cartridge valve assemblies installed in a conventional faucet assembly. This could be either as replacement mechanisms for worn or corroded faucet valve stem mechanisms or as part of a complete new faucet assembly.

Figure 2:
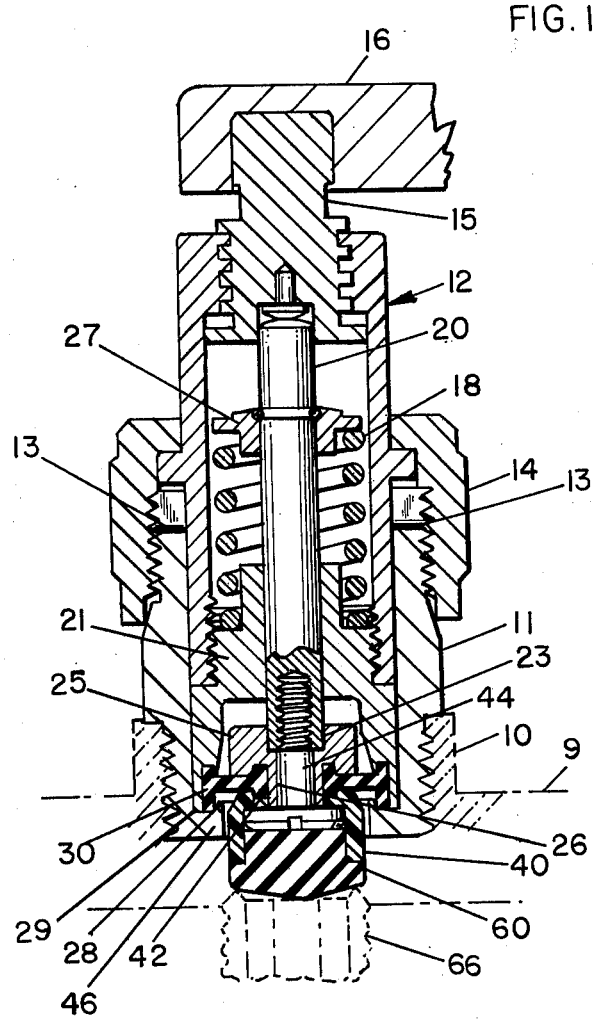
FIG. 2 is a longitudinal section of one of the valve cartridges of FIG. 1 along the line 2—2 thereof. The valve is illustrated in closed position.
Figure 3:
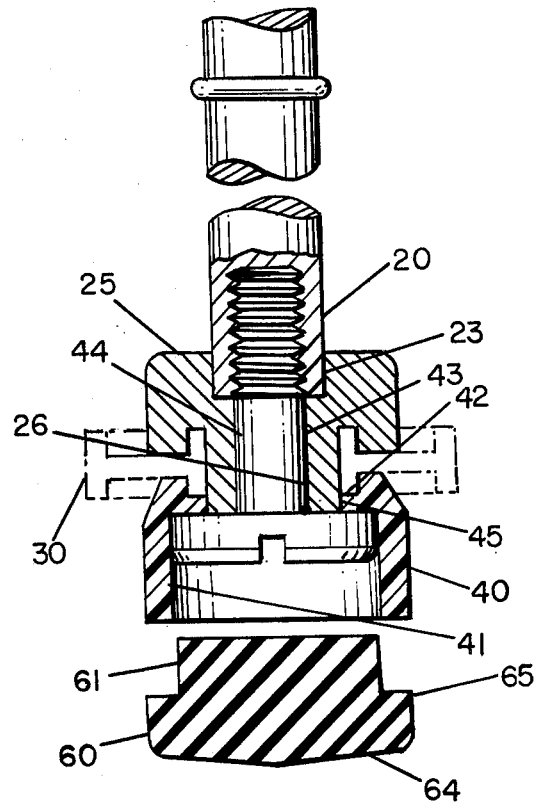
FIG. 3 is an enlarged view of my sealed valve closure assembly.

Referring now to FIG. 2, my valve cartridge assembly will be described with reference to use as a replacement valve mechanism although as mentioned the entire faucet could as well be new.

An integral collar 10 of the faucet housing 9 has threaded therein an adapter nipple 11 which slideably receives my replacement cartridge housing 12. Different adapter nipples can be designed to fit various types of faucet housing. A threaded nut 14 secures the cartridge to the adapter nipple. A threaded actuating member 15 having a handle 16 secured thereto is mounted to be rotated in one direction to force the valve stem 20 downwardly against the bias of spring 18 or in the opposite direction to permit the spring 18 to open the valve.

The lower end of valve stem 20 is slidably received in a cartridge base and guide member 21 which is threaded to the lower end of cartridge housing 12.

Aligned semi-circular slots 13 are provided in the upper cylindrical walls of the adapter nipple 11, permitting insertion of a tool such as the shaft of a screwdriver to thread the adapter into position.

The valve stem 20 includes a stop member 27 for spring 18 and a threaded lower end which projects into an upper recessed portion 23 of a brass collar member 25. The collar member 25 includes a lower annular recessed portion which telescopingly receives the upper edge of a radially inner cylindrical collar of the flexible diaphragm 30. An integral compression limiting sleeve 26 on the collar member 25 projects through the central opening of diaphram 30 and through the passage 45 of housing member 40.

The housing member 40 is constructed of tough corrosion and chemical resistant plastic such as Teflon, polyethylene or polypropylene. The housing member 40 includes an upper counterbored portion 42 that receives in compressed sealing relationship the lower portion of the inner cylindrical collar of diaphragm 30. The seal assembly is secured by a machine screw 44 inserted through the opening 45 in the open end of the housing 40 and threaded into the end of the valve stem 20 to abut tight against the end of the compression limiting sleeve 26.

The outer periphery of the diaphragm 30 has an annular collar that is inserted into an annular groove in the cartridge base member 21 and is clamped within a recess 29 formed by an annular rib 28 in the inwardly entending recessed flange 46 of adapter 11 in tight sealing relationship.

The lower end of the housing member 40 is closed by the resilient sealing member 60 which has a cylindrical holding portion 61 inserted into and frictionally engaged by the inner surface of cylindrical wall 41 in tight sealing relationship. The sealing member includes an enlarged head which is of substantially the same diameter as the housing 40 and which can be grasped by the fingers to insert the holding portion 61 into the housing with a twisting motion. When the sealing member is fully inserted into the housing the shoulder 65 will abut the annular shoulder provided by the end surfaces of cylindrical wall 41. The lower end of the sealing member 60 has a conical sealing face 64 which upon rotation of the handle 6 will be moved vertically to engage the valve seat 66.

The lower end of the valve assembly is thus completely sealed from the upper valve actuating mechanism preventing corrosive liquid from contact with any metal parts to eat away any portion of the valve assembly. In addition, the clamping screw 44 on the lower end of the valve stem 20 is totally protected from corrosive liquid within the sealed housing 40 which itself is constructed of corrosion resistant plastic. Thus, there are no exposed metal faucet parts which can be corroded or eaten away.

Adding to the life of the faucet assembly is the fact that my faucet stem and sealing member 60 is not rotated or "ground" into engagement with the metal seat 66 as is usually the case with many conventional faucet assemblies requiring frequent replacement. Rather my sealing member simply moves vertically with very slight rotative pressure on the handle under the bias of the spring 18 so that the life of the faucet seal assembly should last the life of the faucet itself.

If a conventional rotating stem type faucet valve mechanism requires replacement it is necessary only to unscrew the old valve mechanism from a housing such as shown at 9 which has a collar 10 or similar threaded connector. An adapter 11 is selected to fit the type of valve being repaired and is then threaded into position. The cartridge housing 12 is then simply inserted into the adapter and secured by the nut 14 whereby the repaired faucet is ready to use.

Some modifications would of course be necessary for use on different manufacturers faucet housings or if the cartridge is installed initially in a new faucet. Such changes would depend largely on the type and style of the housing. Other changes could be made such as providing a chromed valve cover to fit over the securing nut 14 extending to the housing 9. The nut 14 also could be provided with a skirt to extend to the housing 9.

While the invention has been shown and described herein with respect to a replacement cartridge to repair a worn or corroded faucet valve it is not the intent to limit the improved features to such an assemblage. It is apparent that the valve assembly of the invention could be used with different type faucets other than what is shown and described herein.

What is claimed is:

1. A valve cartridge assembly comprising: a generally cylindrical body portion having a base member threaded thereto, a valve stem slideably mounted in and extending through said base member, a threaded operating member rotatably mounted in the upper end of said cylindrical body portion and abutting the upper end of said valve stem, a coil spring surrounding said valve stem having a lower portion engaging said base member and an upper portion engaging a stop member secured to said valve stem and biasing said valve stem upwardly against said operating member, a collar member on the lower end of said valve stem having an integral centrally disposed sleeve projecting therefrom, a resilient diaphragm member having an inner annular rib defining a central opening telescoped over said sleeve and having an outer peripheral rib sealingly secured to said base member, a hollow generally cylindrical nonmetallic housing member having a radially inwardly extending base and generally cylindrical side walls, a central opening in said base surrounded by an annular groove portion, said opening in said housing being disposed over said sleeve, a threaded fastening member having an enlarged head disposed in said housing member and a shank disposed in said collar member and threaded into the lower end of said valve stem with said enlarged head providing a stop shoulder abutting the end of said sleeve and sealingly clamping the diaphragm between said collar member and said housing member, a resilient sealing member adapted for engagement with a valve seat having an enlarged head of substantially the same diameter as said housing and a cylindrical reduced diameter portion extending in said housing member and frictionally and sealingly engaged therewith, whereby said fastening member within said housing is totally sealed and protected from contact with corrosive liquids, said assembly being operative upon rotation of said operating member to cause said valve stem to move within said cartridge and thereby cause said sealing member secured thereto to move toward and away from said cartridge base member.

2. The subject matter of claim 1 further including an adapter nipple having a cylindrical inner surface and externally threaded upper and lower portions thereon with an annular inwardly extending recessed flange at the lower portion thereof, said cartridge having an annular flange disposed about its outer cylindrical surface, said cartridge having one end disposed within and abutting the inwardly extending recessed flange of said adapter and a threaded nut engaging said cartridge annular flange and threaded to said adapter upper portion, said diaphragm outer rib sealingly engaging said adapter inwardly extending recessed flange.

3. The subject matter of claim 2 further including aligned slots in the upper threaded portion of the adapter to receive a tool for rotating the adapter into threaded position.

4. The subject matter of claim 1 wherein the fastening member had a generally flat head and the cylindrical portion of said resilient sealing member terminates closely adjacent said generally flat head.

* * * * *